United States Patent
Visagie et al.

(10) Patent No.: US 7,140,961 B2
(45) Date of Patent: Nov. 28, 2006

(54) COMBINE HARVESTER

(75) Inventors: Andrie Visagie, Bothaville (ZA);
Thomas Barrelmeyer, Versmold (DE)

(73) Assignee: Claas RGaA (DE)

( * ) Notice: Subject to any disclaimer, the term of this patent is extended or adjusted under 35 U.S.C. 154(b) by 19 days.

(21) Appl. No.: 10/472,418

(22) PCT Filed: Jan. 24, 2002

(86) PCT No.: PCT/EP02/00682

§ 371 (c)(1),
(2), (4) Date: Mar. 11, 2004

(87) PCT Pub. No.: WO02/074062

PCT Pub. Date: Sep. 26, 2002

(65) Prior Publication Data

US 2004/0162123 A1    Aug. 19, 2004

(30) Foreign Application Priority Data

Mar. 19, 2001  (GB) .................................... 0106730

(51) Int. Cl.
*A01F 7/06* (2006.01)
(52) U.S. Cl. ..................... 460/66; 460/119; 460/79
(58) Field of Classification Search ................. 460/16, 460/25, 59, 65, 66, 67, 68, 69, 70, 79, 80, 460/81, 84, 119
See application file for complete search history.

(56) References Cited

U.S. PATENT DOCUMENTS

| | | | | |
|---|---|---|---|---|
| 1,949,725 A | * | 3/1934 | McDow | 460/80 |
| 2,905,182 A | * | 9/1959 | Wise | 460/64 |
| 3,122,499 A | | 2/1964 | Witzel et al. | |
| 3,228,176 A | * | 1/1966 | Stout et al. | 56/16.5 |
| 3,464,419 A | | 9/1969 | Knapp et al. | |
| 3,529,645 A | * | 9/1970 | De Pauw et al. | 241/101.2 |
| 3,534,742 A | * | 10/1970 | De Pauw et al. | 460/68 |
| 3,556,108 A | * | 1/1971 | Knapp et al. | 460/97 |
| 3,586,004 A | * | 6/1971 | De Pauw et al. | 460/68 |
| 3,703,802 A | * | 11/1972 | Wrestler et al. | 56/13.3 |
| 4,209,024 A | | 6/1980 | Powell et al. | |
| 4,230,130 A | * | 10/1980 | Staiert | 460/5 |

(Continued)

FOREIGN PATENT DOCUMENTS

DE    19839424    4/1999

(Continued)

*Primary Examiner*—Meredith C. Petravick
(74) *Attorney, Agent, or Firm*—Husch & Eppenberger, LLC; Robert C. Haldiman

(57) ABSTRACT

A combine harvester with a rotor housing which is positioned in a lengthwise direction and with an inclined angle towards the horizontal line inside of the combine. To arrange the rotor housing in a favorable way inside of the combine harvester, it is suggested to use a feeder house which comprises elements which distribute harvested material from the cutterbar in an up and rearward direction towards its discharge end, said discharge end being arranged in a height substantially above of the rotational axis of the front wheels and in a region before the rotational axis of the front wheels, the discharge end feeds the harvested material into the feeding opening of the rotor housing of the separation unit being arranged in the upper half of it, whereby the rotor housing reaches with its front from a region before the rotational axis of the front wheels and a lower third of the height of the combine harvester to its rear being arranged in the top rear half portion of the combine harvester.

19 Claims, 2 Drawing Sheets

U.S. PATENT DOCUMENTS

| | | | |
|---|---|---|---|
| 4,265,077 A * | 5/1981 | Peters | 56/14.6 |
| 4,270,550 A * | 6/1981 | daSilva | 460/66 |
| 4,282,703 A | 8/1981 | Wilson et al. | |
| 4,386,492 A * | 6/1983 | Tilby | 56/13.9 |
| 4,408,618 A | 10/1983 | Witzel | |
| 4,611,606 A * | 9/1986 | Hall et al. | 460/80 |
| 5,454,758 A * | 10/1995 | Tophinke et al. | 460/68 |
| 5,556,337 A * | 9/1996 | Tophinke et al. | 460/70 |
| 5,794,423 A * | 8/1998 | McLeod | 56/14.6 |
| 5,797,793 A * | 8/1998 | Matousek et al. | 460/111 |
| 6,230,829 B1 * | 5/2001 | Martin et al. | 180/6.3 |
| 6,247,295 B1 * | 6/2001 | Hansen et al. | 56/10.2 A |
| 6,780,102 B1 * | 8/2004 | Visagie et al. | 460/70 |

FOREIGN PATENT DOCUMENTS

| | | |
|---|---|---|
| FR | 2058646 | 5/1971 |
| GB | 2354689 | 4/2001 |
| WO | 8604775 | 8/1986 |
| WO | 9729628 | 8/1997 |

\* cited by examiner

COMBINE HARVESTER

CROSS REFERENCE TO RELATED APPLICATIONS

This application claims priority of PCT Application No. PCT/EP02/00682 filed 24 Jan. 2002 and which named the United States as a designated country. PCT Application PCT/EP02/00682 was published on 26 Sep. 2002 as Publication No. WO 02/074062 A1 and claims priority of prior Foreign Application No. 0106730.5 filed in Great Britain on 19 Mar. 2001.

TECHNICAL FIELD OF THE INVENTION

The present invention relates to a combine harvester with a separation unit comprising a rotary driven separation rotor arranged in a rotor housing with a feeding zone where harvested material is fed into the rotor housing, a separation zone with sieve means arranged in the rotor housing, of said separation zone, a discharge zone which is located at the discharge end of the rotor housing and a sucking blower unit which sucks an air flow stream at least through the sieve means into the separation zone and the discharge zone, and a grain collecting element arranged in some distance towards the sieve means, all arranged such that a part of the air flow stream is sucked into the separation zone from the space between the sieve means and the grain collecting, element, the rotor housing containing, the separation rotor being arranged in the combine harvester in a way that the longitudinal axis of the rotor housing and the separation rotor is erected by an angle of more than 30 degrees from its front end to its discharge end.

DESCRIPTION OF THE RELATED ART

Such a separation unit is known from PCT/US 97/02432. However, that separation unit disclosed in the cited reference has commercially been available only as a pull-type combine harvester with just one axle which needs to be towed and driven by a tractor. The cutterbar has been attached to the side of the separation unit, and the harvested material has been fed into the rotor housing, from the side. To be able to raise the performance level which can be achieved with the functional principles of such separation unit technology it is desirous to integrate such a separation unit into a self-propelled combine. Due to the fact that for a proper function of such a separation unit the longitudinal axis of the rotor housing, and the separation rotor needs to be erected by an angle of more than 30 degrees from its front end to its discharge end, such a separation unit is difficult to integrate into the known concepts of self-propelled rotary combines.

The harvested material needs to be lifted up by a feeder house and transported through the gap defined by the front axle or a crosswisely arranged beam of the machine frame at the bottom, the front wheels at the side and the driver's platform at the top. The bottom of this gap is usually positioned approximately above the lowest third of the height of the combine. In conventional rotary combine harvesters, the threshing and separation rotors are arranged horizontally so that they can project from a space in the gap above the front axle over the full length of the combine up to the discharge zone at the rear. An example for such an arrangement is disclosed in U.S. Pat. No. 4,209,024. If the separation unit disclosed in the cited reference should be adapted into such a combine respectively, the harvested material needs to be distributed from the bottom into the rotor housing, which usually makes additional feeding elements necessary, and due to the fact that the lower feeding zone is already arranged approximately in the second third of the total height of the combine harvester, the total possible length of the rotor housing which needs to be arranged in an erected position in the combine is limited, which also limits the separation performance of the separation unit.

A similar arrangement is shown in U.S. Pat. No. 3,464,419. The separation rotor housing is slightly inclined towards the rear, however, the rotor only projects into a space above the front axle and is respectively short. A very long feeder house is attached to the front of the combine harvester to lift the harvested material upwards to be able to feed it into the rotor housing from above. The disadvantage of such an arrangement is that the feeder house cannot be designed rigid enough to be able to carry cutterbars with working widths and weights as they are commonly used today.

According to an arrangement known from U.S. Pat. No. 3,703,802 a threshing drum could be arranged in the gap between the front axle and the driver's platform, and from the discharge end of the threshing drum the harvested material is fed from above into the feeding zone of a rotary separation unit which is arranged at a lower height as the threshing drum inside of the combine. With such an arrangement, the path of the harvested material through the combine needs to be deviated several times, which costs energy and might cause clogging under difficult circumstances. A similar arrangement is disclosed in U.S. Pat. No. 4,408,618.

SUMMARY OF THE INVENTION

It is the object of the present invention to arrange a separation unit as known from prior art in a self-propelled combine harvester in a favorable way which avoids the disadvantages known from arrangements disclosed in prior art.

The objects and advantages of the invention are accomplished by a feeder house which comprises elements which distribute harvested material from the cutterbar in an up-and rearward direction towards its discharge end, said discharge end being arranged in a height substantially above of the rotational axis of the front wheels and in a region before the rotational axis of the front wheels, the discharge end feeds the harvested material into the feeding opening of the rotor housing of the separation unit being arranged in the upper half of it, whereby the rotor housing reaches with its front from a region before the rotational axis of the front wheels and a lower third of the height of the combine harvester to its rear being arranged in the top rear half portion of the combine harvester.

With such an arrangement it is possible to achieve a high length of the rotor housing with a high potential performance of the separation function. The tools inside of the rotor housing may be designed less aggressively because due to the extended length of the separation rotor the time the harvested material remains inside of the rotor housing is also extended. This reduces kernel breakage and the straw may be less damaged, which also reduces specific energy consumption of the separation process. The technical term "separation unit" does not mean that the function inside of the separation unit is strictly limited to a separation function only, in fact it may be advantageous if threshing elements are arranged inside of the rotor housing, and also the separation rotor may be equipped with threshing tools enabling it to bring a threshing action upon the harvested material fed through the rotor housing. By such an arrangement special elements for a threshing action, such as a separate threshing drum with a concave, can be saved. The terms "front," "rear," "behind" are to be understood in rotation to the lengthwise direction of the combine harvester, seen in the forward driving direction of the combine harvester. Rear portion of the combine harvester means a region which is in the upper third to half of the height of the combine, and which is above or behind the rotational axis of the rear wheels of the combine harvester. The high discharge end of the rotor housing means that there is ample of space for spreading the discharged straw and other fractions from the separation and cleaning process sideward and backward over the working width of the combine harvester, even if there are straw choppers or chaff spreaders integrated in the process.

Due to the fact that the rotor housing and separation unit is inclined by more than 30 degrees, it is possible to arrange the rotational axis of the front wheels, the front axle and also the front crosswise beam of the frame of the combine harvester behind the lower front of the rotor housing and underneath of it. Also brakes and gearboxes can be arranged under a medium section of the rotor housing. For such an arrangement it is advantageous if there are no concaves, sieves or the like at least in the first fifth of the length of the rotor housing through which fractions of the harvested material may be separated, because feeding elements which feed the separated fractions away are difficult to accommodate in that region, they would spatially interfere with the frame, axle, gearboxes, brakes and the like.

To ease the flow of harvested material from the discharge zone of the feeder house into the feeding opening of the rotor housing, it is suggested that the circumference of the rear rotating element of the feeder house projects into the upper half of the front of the rotor housing. Furthermore, the feeding, opening, of the rotor housing is surrounded by a sheet metal which projects over the width of the feeder house, and the form of the sheet metal is adapted to the circumferential shape of the rear rotating element. In general, the radial circumference of the rear rotating element of the feeder house partially cuts into the upper half of the rotor housing along a curved line in a cross-sectional view, and the circumferential shape of the separation rotor is adapted towards the circumference of the rear rotating element in the space of the feeding opening of the rotor housing in a way so that they do not interfere with each other. By these measurements, an additional feeder drum may be saved. In a preferable arrangement, there are only two rotating elements arranged inside of the feeder house: one front rotating element and one rear rotating element. The front rotating element may have a greater diameter than the rear rotating element. The shape of the floor of the feeder house may partially be adapted to the circumferential shape of the front rotating element, the rear rotating element or even both, to improve the feeding action the rotating elements apply upon the harvested good.

Further features and advantages of the present invention, as well as the structure and operation of various embodiments of the present invention, are described in detail below with reference to the accompanying drawings.

BRIEF DESCRIPTION OF THE DRAWINGS

Reference is now made more particularly to the drawings which illustrate the best presently known mode of carrying out the invention and wherein similar reference characters indicate the same parts throughout the views.

DETAILED DESCRIPTION

Figure 1:
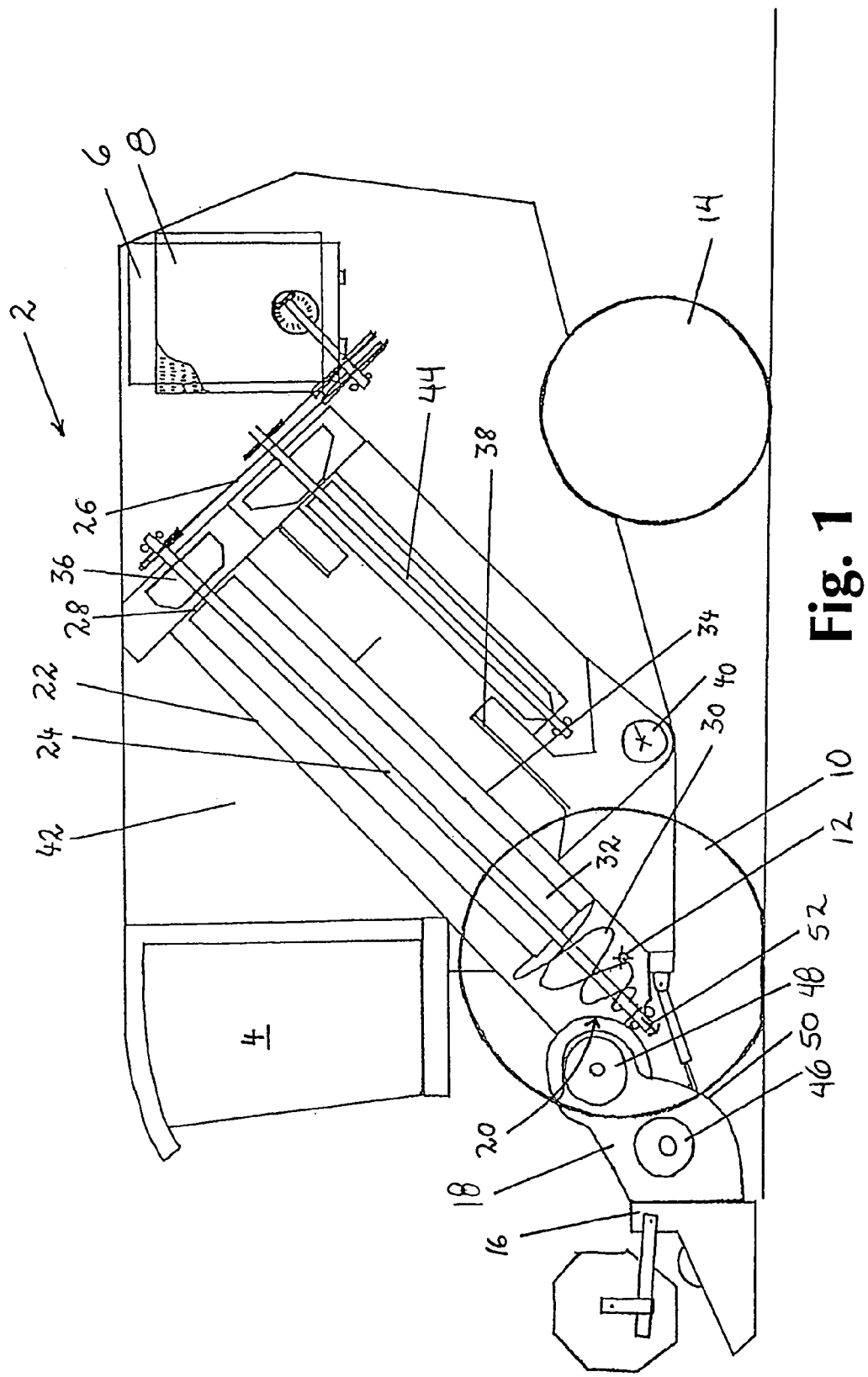
FIG. 1 is a side-view upon a self-propelled combine harvester.

A combine harvester 2 shown in FIG. 1 is equipped with a driver's cabin 4, an engine 6 with a cooling system 8, a front wheel 10 with a rotational axis 12, a rear wheel 14, a cutterbar 16, and a feeder house 18, which distributes the harvested material from the cutterbar 16 into the feeding opening 20 of the rotor housing 22. Inside of the rotor housing 22 there is arranged a separation rotor 24 which is rotatably driven by driving elements 26, here shown as pulley drives, from the power of engine 6. Seen along the rotational axis of the separation rotor 24 from the feeding opening 20 towards the dis-charge end 28 of the rotor housing 22, the front section of the separation rotor 24 comprises auger blades 30 which approximately define the length of the feeding zone where the harvested material is fed into the rotor housing 22. The middle and rearward section of the separation rotor 24 is equipped with beater plates 32 which approximately define the length of the separation zone along the length of the rotor housing 22. It is noted here that the tools for feeding the harvested material into the rotor housing and threshing and separating the harvested material may also be different from auger blades or beater plates, they are mentioned here just as examples. Of course an expert could also choose other tools which he is aware of and which serve his desired function. The bottom portion of rotor housing 22 comprises of sieve means 34, through which grain kernels and chaff may exit the rotor housing 22.

The sucking blower unit 36 sucks an air flow stream at least through the sieve means into the separation zone of the rotor housing 22 and from there towards the discharge zone 28 and out of the rotor housing 22 and out of the combine harvester 2. Grain kernels which exit the rotor housing 22 through the openings of sieve means 34 fall at least partially on the grain collecting element 38 which guides the grain kernels by gravitational forces towards the grain collecting auger 40, which distributes the collected grain into a grain conveyor not shown, which feeds the grain into the grain tank 42. The air flow stream generated by the sucking blower 36 is moving through the intermediate space between the sieve means 34 and the grain collecting element 38.

The inclined arrangement of rotor housing 22 and the separation rotor 24, which is arranged inside of rotor housing 22, by more than 30 degrees towards the horizontal plane brings some advantages. First of all, it reduces the speed of the harvested material inside of the rotor housing towards the discharge end 28, so that it rotates inside of the rotor housing 22 along a longer traveling path with more opportunities for separating grain kernels. Due to the fact that the gravitational forces are acting with more effect upon the heavier fractions of the harvested material like the grain kernels, they tend to move slower through the rotor housing 22, which brings some separational effect upon them in relation to the lighter fractions of the harvested material like straw or chaff. An additional advantage is that the grain can be collected by simple grain collecting elements 38 and transported towards the collecting auger without any further driven elements. Also for using the second separation rotor 44 as a cleaning apparatus for the fraction of grain kernels and chaff which has exited the rotor housing 22, it is advantageous to have an inclined arrangement of the rotor housing 22, because the air flow stream which is moving along the outer surface of the sieve means 34 towards the sucking blower unit 36 cannot suck the grain kernels upwardly very easily due to their weight, so that they tend to fall either onto the grain collecting element 38 or into the second grain exit towards the second separation rotor 44.

The feeder house 18 contains at least two rotation elements, one front rotating element 46 and one rear rotating element 48. The shape of floor 50 of the feeder housing 18 is partially adapted to the circumference of the rotating elements 46,48. In the region where the arrow 20 points to the line which symbolizes the crosswisely arranged cylindrical shape of the feeder house 18 which houses the rear rotating element 48 in the region of its discharge end, which also may be the feeding opening of the rotor housing 22. The crosswisely arranged cylindrical shape of the feeder house 18 cuts into the up-per half of the lengthwisely arranged substantially cylindrical shape of the rotor housing 22. The rotating energy of the separation rotor 24,44 can be transmitted to subordinated elements, which is symbolized by arrow 52.

Figure 2:
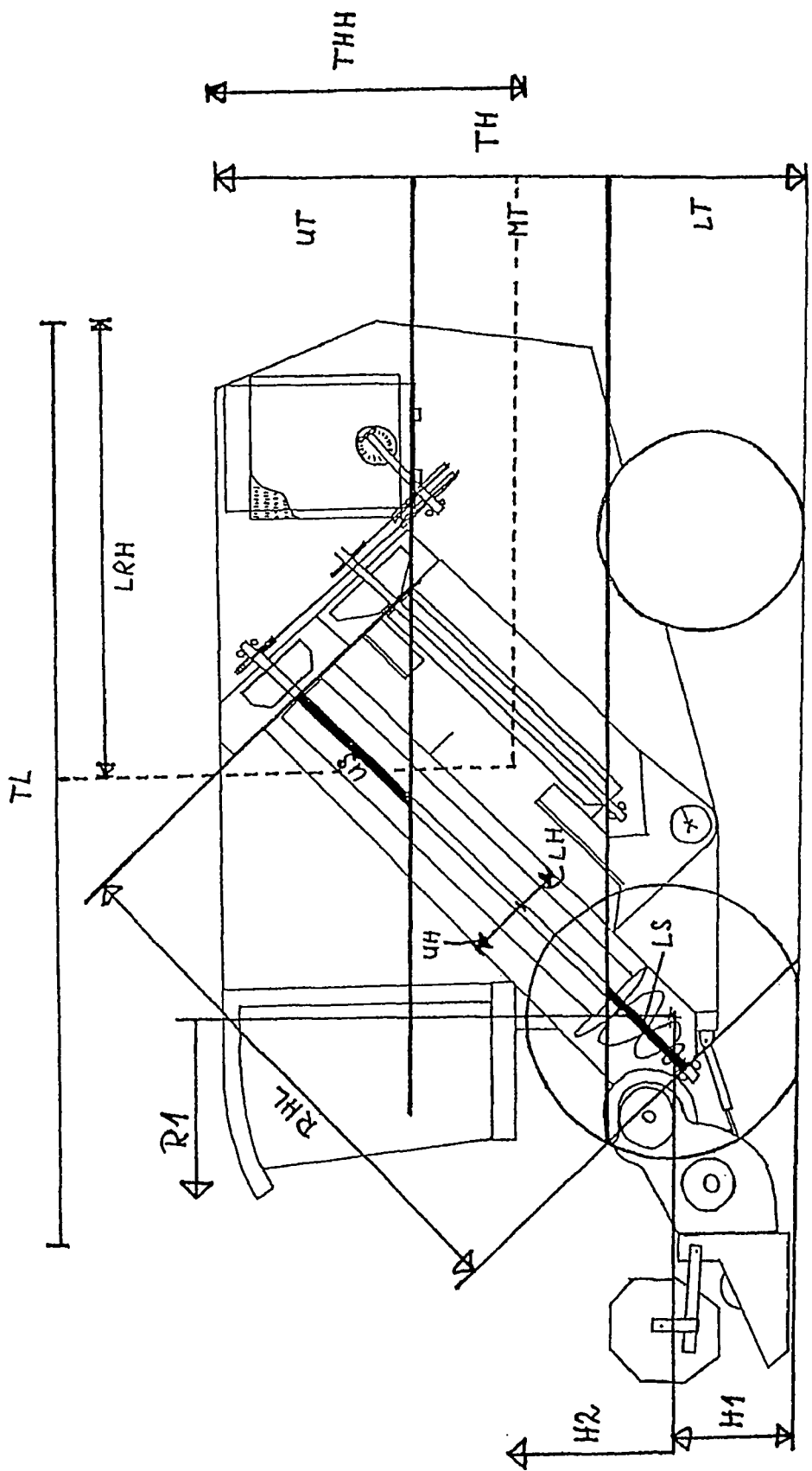
FIG. 2 is a side view upon the combine harvester with certain information about the geometrical arrangement of the rotor housing inside of the combine harvester.

In FIG. 2 the total length TL and the total height TH of the combine harvester 2 is indicated by arrows along the side view upon the machine. The total length TL is measured from the front end of the feeder house 18 to the rear hood of the combine harvester 2. The total length of the rotor housing 22 is indicated by the arrow RHL, and it is measured from the front wall of the rotor housing 22 towards the discharge end where the straw is exiting the rotor housing 22 towards the sucking blower unit 36.

If the rotor housing 22 is seen in a sideward cross-sectional view not the lengthwise view as shown in FIG. 2 an upper half UH and a lower half LH of the rotor housing 22 can be defined. It is noted that the upper and lower section is not necessarily cut into two equal halves, the term "half" is here meant rather the way that there is an upper and lower portion of the whole rotor housing body. The feeding opening 20 is arranged in the upper half UH at the front end of the rotor housing 22. If the total height of the combine harvester 2 is divided into three sections, there are the upper third section UT, the medium third section MT and the lower third section LT. The front end of the rotor housing 22 is located in a region of the lower third LT of the total height TH of the combine harvester. The lower section LS of the shaft of the separation rotor 24 which reaches into the lower third of the total height TH of the combine harvester 2 is shown in a fat black line, like the upper section US of the separation rotor 24 which reaches into the upper third UT of the total height of the combine harvester 2.

As it can be seen in FIG. 2, the discharge end of the feeder house 18 and the feeding opening 20 of rotor housing 22 is arranged in a height substantially above of the distance H1 of the rotational axis 12 of front wheel 10 from the ground. The discharge end of the feeder house 18 and the feeding opening 20 of rotor housing 22 are also arranged in a region before the rotational axis 12 of front wheel 10, this region is indicated by arrow R1. In general, it can be said that the discharge end of the feeder house 18 respectively the feeding opening 20 of rotor housing 22 are arranged in a square whose position being defined by arrows H2, R1 in FIG. 2.

The rear of the rotor housing 22 reaches with its discharge end 28 into a region which is located in a square defined by the arrows which indicate the rear half length LRH and the top height half THH. This square is shown in dotted lines, and it shows the top rear half portion of the combine harvester 2.

With an arrangement as described it is possible to position the rotor housing 22 in a combine harvester 2 in a way which keeps the total length TL as short as possible, the length RHL of the rotor housing 22 can be made as long as possible, and a satisfactory erection angle of rotor housing 22 higher than 30 degrees can be achieved so that the gravitational forces can act upon the separation process in a favorable way.

If the rotor housing 22 is arranged in the combine harvester 2 as described, it is possible to position the engine 6 in a location also in the top rear half portion of the combine harvester 2 behind the rear end of the rotor housing 22. This is advantageous because the power of the engine doesn't need to be transported over long distances towards the separation rotor 24, which saves costs and weight. The high arrangement of the engine also avoids that the cooling system sucks in too much straw which is blown out in a downward direction by the sucking blower means 36 and the blower of the second separation unit. The power necessary to drive the cutterbar 16 and the feeding elements 46, 48 arranged inside of the feeder house 18 or other working components or generators of hydraulic pressure or electrical energy may be transmitted by the shaft of separation rotor 24 or 44 from the rear to the front of the combine harvester 2. This saves additional drive train elements and it keeps the width of the combine harvester 2 slim. The PTO stubble shaft of the separation rotors 24, 44 may be equipped with toothed wheels which transfer the rotating energy to subordinated shafts, hydraulic pumps, electric generators, gearboxes or the like. For the sake of simplified demonstration, the possibility of driving any other components is indicated by arrow 52.

In the triangle defined by the upper half UH of the rotor housing 22, the rear wall of the cabin 4 and the top margin of the combine harvester 2 is easy to accommodate the grain tank 42. If there is only one separation rotor contained in the rotor housing (two in a side-by-side arrangement are possible), the space of the grain tank 42 may even reach downwardly along the sides of rotor housing 22, so that the grain tank 42 is designed as a saddle tank.

To achieve enough space to place the front end of rotor housing 22 as low as possible, it is advantageous to avoid a rigid front axle or a crosswisely arranged beam of the machine frame in the region proximate to the front wheel. To drive the front wheels, small hydraulic or electric motors can be placed next to each wheel so that one motor drives one wheel.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A separation unit for a combine having two front wheels and a cab, said separation unit comprising:
   a separator rotor, said separation rotor having a shaft and said shaft having an entry end and a discharge end;
   a rotor housing, said rotor housing substantially enclosing said separation rotor, said rotor housing having an entry end and a discharge end, said entry end having a top and bottom;
   said entry end of said rotor housing and said separator rotor being between said two front wheels;
   said discharge end of said separation rotor and said discharge end of said rotor housing being entirely within a top one third of a total combine height, said total combine height being measured from the ground to a top of the cab; and
   said bottom of said entry end of said rotor housing being below an axle of the front wheel.

2. The apparatus of claim 1 wherein said entry end of said shaft of said separation rotor is also below said axle of the front wheel.

3. The apparatus of claim 1 wherein a left front and a right front wheel have separate axles.

4. The apparatus of claim 1 further comprising a feed housing and at least one rotating feed element, said rotating feed element having a transverse axis of rotation and said top of said entry end of said rotor housing being cutaway to operatively engage said circumference of said rotating feed element.

5. The apparatus of claim 4 wherein said feed housing has a floor and said floor is at least partially cylindrical, said cylindrical portion of said floor of said feed housing being concave towards said rotating feed element and dimensioned to closely cooperate with said rotating feed element for feeding crop towards said separation rotor.

6. The apparatus of claim 1 wherein said shaft of said separation rotor includes a drive shaft, said drive shaft being operatively engaged with an engine at said discharge end of said shaft and said drive shaft being operatively engaged with at least one working element at said entry end of said shaft.

7. The apparatus of claim 6 wherein said at least one working element operatively engaged with said drive shaft is at least one rotating feed element.

8. The apparatus according to claim 1, wherein a circumference of at least one rotating feed element of a feed house projects into said top of said entry end of said rotor housing.

9. The apparatus according to claim 1, wherein said entry end of said rotor housing is surrounded by a sheet metal, said sheet metal reaching over a width of a feed house, and said sheet metal being adapted to the circumferential shape of at least one rotating feed element.

10. The apparatus according to claim 1, wherein a radial circumference of at least one rotating feed element of a feed house partially intersects a top of an upper half of said rotor housing along a curved line such that said at least one rotating feed element and said separation rotor do not interfere with each other.

11. The apparatus according to claim 1, further comprising a front rotating element and a rear rotating element arranged in a feed house, such that the harvested good is directly distributed into said entry of said rotor housing by said rear rotating element.

12. The apparatus according to claim 1, wherein a floor of a feed house is adapted to a circumferential shape of at least one of a front rotating feed element, or a rear rotating feed element.

13. The apparatus according to claim 1, wherein there are no elements arranged in the first fifth of the length of said rotor housing which allow a separation of fractions of the harvested material.

14. The apparatus according to claim 1, further comprising an engine positioned in a location in a top rear half portion of the combine harvester behind said discharge end of said rotor housing.

15. The apparatus according to claim 1, wherein said shaft of said separation rotor conveys power from a rear to a front of the combine harvester to drive at least one working component inside of the feed house.

16. The apparatus according to claim 1, wherein further working components operatively engageable with said separation unit are selected from the group consisting of a cutterbar and a feeding element.

17. The apparatus according to claim 15, wherein said power conveyed by said separation rotor is selected from the group consisting of electrical, mechanical and hydraulic.

18. The apparatus according to claim 1, wherein an upper portion of said rotor housing, a rear wall of the cab and a top margin of the combine harvester define a triangular space adapted to accommodate a grain tank.

19. The apparatus according to claim 1, further comprising at least two motors each individually mounted to drive each wheel.

* * * * *